Nov. 13, 1962  E. KOLISCH  3,063,638
EQUIPMENT FOR DETERMINING THE CENTER OF GRAVITY OF AN AIRCRAFT
Original Filed July 13, 1954
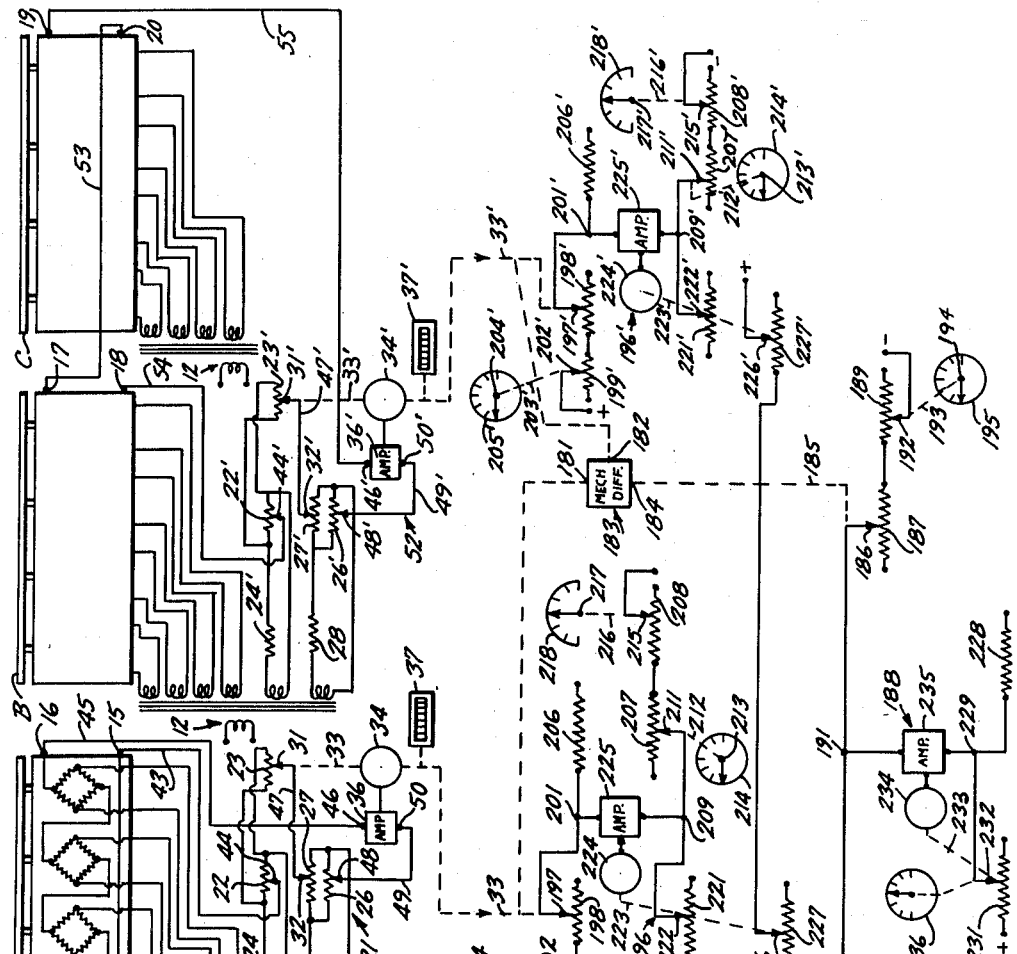
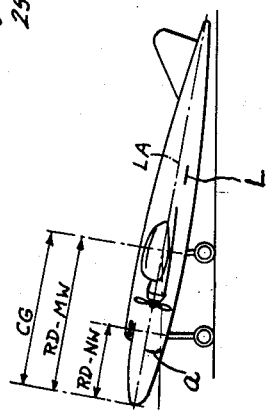
INVENTOR.
EMIL KOLISCH
BY
Dean, Fairbank & Hirsch
ATTORNEYS United States Patent Office 3,063,638
Patented Nov. 13, 1962

3,063,638
EQUIPMENT FOR DETERMINING THE CENTER OF GRAVITY OF AN AIRCRAFT
Emil Kolisch, New York, N.Y., assignor to Continental Electrolog Corp., New York, N.Y., a corporation of New York
Original application July 13, 1954, Ser. No. 442,982, now Patent No. 2,872,807, dated Feb. 10, 1959. Divided and this application Jan. 8, 1959, Ser. No. 785,589
5 Claims. (Cl. 235—193)

As conducive to an understanding of the invention, it is noted that in order for an aircraft to take-off, fly and land safely, its center of gravity along the length of the plane must be at some predetermined location which may vary between certain definite fixed limits.

In order that the determination of the center of gravity of the aircraft at time of takeoff be accurate, the weight of the crew and passengers and their position in the aircraft must be a factor in the determination of center of gravity by the equipment.

If, when the center of gravity of the aircraft is determined, it is necessary for the crew and passengers or a like number of personnel to be at their assigned stations in the aircraft and the aircraft is not to take off immediately after such determination, the need for such personnel to be available and to go on board the aircraft is time-consuming and interferes with the performance of the normal duties of such personnel.

It is to be noted that the center of gravity as determined with the aircraft grounded and thus inclined from level flight attitude will differ from the center of gravity in actual flight.

Where to compensate for such deviation from level flight attitude, the aircraft is physically levelled by means of jacks, for example, the operation is difficult and time-consuming and requires the services of many personnel at great cost and with possible damage to the aircraft as a result of slippage of such jacks.

Unless the factors above described are taken into consideration in operation, the center of gravity as determined by the equipment may differ from the true center of gravity of the aircraft to such extent as to entail harmful consequences in those cases in which the difference is sufficient to exceed the safe limits prescribed for take-off, flying and landing.

It is accordingly among the objects of the invention to provide an equipment which is simple, compact, relatively light in weight and readily portable and which has a minimum of moving parts and thus is not likely to become deranged by even an unskilled person and will automatically take into account the actual weight of the loaded aircraft and the actual position of its contents, and which will, without need for time-consuming calculations or manipulations of any sort, and without the need for consulting tables or any other operation subject to human error, quickly and accurately determine and indicate the distance of the center of gravity of the aircraft from a given reference datum based upon the distribution of the actual weight of the aircraft on each set of supporting gear and the actual distance of each set of supporting gear from the reference datum and which also may readily be set to take into account the angle of inclination of the aircraft and the weight and location of crew and personnel without need for the presence of such personnel.

Another object is to provide an equipment by which the true position of center of gravity with respect to any given reference datum may be observed at all times as the loading proceeds, so as to dispense with the need for extensive shifting of the cargo in a fully loaded aircraft which may become necessary to assure safety when such guidance is not afforded.

Another object is to provide an equipment of the above character which is universally applicable, by resort to a simple manipulation, to be set to effect any and all the compensations noted in determining center of gravity for any of various models, sizes and specifications of aircraft within the range of the equipment.

According to the invention, these objects are accomplished by the arrangement and combination of elements hereinafter described and particularly recited in the claims.

This application is a division of co-pending application Serial No. 442,982, now Patent No. 2,872,807, filed July 13, 1954.

In the accompanying drawings in which are shown one or more of various possible embodiments of the several features of the invention, FIG. 1 is a diagrammatic view of one embodiment of the invention where the moments are determined about a given reference datum, and FIG. 2 is a diagrammatic view of a grounded airplane.

In the illustrative embodiment of FIG. 1 of the drawings in which the center of gravity is determined by adding the moments about a given reference datum, for example, the nose of the aircraft, as diagrammatically shown at A, B and C, platforms are provided to carry the additional gear, usually the nose wheel of the aircraft and the main gear usually the two main wheels, respectively.

Associated with each of the platforms are weight responsive devices which may be suitable impedence units such as networks of strain gauges 11 of familiar type commonly known as "load cells," usually four in number to support the respective corners of the ordinarily rectangular platform. As diagrammatically shown, with respect to platform A, a transformer 12, the primary winding 13 of which is connected to a source of alternating current, has secondary windings 14 connected respectively to the inputs of the several strain gauges 11. Like transformers 12 are similarly related to the strain gauges on platforms B and C. The outputs of all of the strain gauges of each platform are connected in series, as shown, and when subjected to the weight borne on the platform, the voltage evolved by the strain gauges under the applied potential will be applied respectively across terminals 15, 16 of platform A; terminals 17, 18 of platform B and terminals 19, 20 of platform C.

According to the illustrative embodiment herein shown, in order correctly and automatically to determine the weight on platform A and platforms B and C, the voltage output of the associated strain gauges due to the weight of the unloaded platform A and platforms B and C is first balanced out as by a countervailing voltage, and then the output voltage of the strain gauges, due to the load on platform A and platforms B and C is balanced out also by a countervailing voltage, the same means which regulates such latter countervailing voltage controlling an indicator calibrated in increments of weight.

Although any suitable balancing circuit may be used, in the illustrative embodiment herein shown with respect to platform A, such balancing circuit 21 desirably includes a pair of parallel connected resistors 22 and 23, which are connected in series with a resistor 24 to a secondary winding 25 of the transformer 12, and a second pair of parallel connected resistors 26 and 27 connected in series with a resistor 28 to another secondary winding 29 of the transformer 12. The two resistors 23 and 27 serve as voltage dividers, as hereinafter set forth.

Although the resistors 23 and 27 may be of any suitable type, they each desirably form part of a potentiometer having a movable contact arm 31, 32, respectively.

The contact arm 32 is manually adjustable to any desired setting in order to balance out the weight of the unloaded platform. The contact arm 31 is controlled by the shaft 33 for automatic setting to balance out the load on the platform, by means of a servo-motor 34 which is connected to a servo-amplifier 36. The servo-motor and servo-amplifier may be of the type sold by Brown Instrument Company. The shaft 33 desirably controls a suitable indicator, illustratively a counter 37, such as that put out by Veeder Root Company, which is calibrated in increments of pounds to indicate when the weight borne by the unloaded platform A is balanced out by the adjustment of arm 32.

The output terminals 15, 16 of platform A are desirably connected respectively by lead 43 to an adjustable tap 44 engaging the resistor 22, and by lead 45 to terminal 46 of servo-amplifier 36. The contact arm 31 engaging the resistor 23, is connected by lead 47 to contact arm 32 of resistor 27. The resistor 26 is desirably center tapped as at 48 and such center tap is connected by lead 49 to terminal 50 of servo-amplifier 36.

The strain gauges of platforms B and C are connected in series and the combined output of said platforms are fed to a balancing circuit 52 identical to balancing circuit 21 and having the same reference numerals primed. To this end, the terminal 17 of platform B is connected by lead 53 to terminal 20 of platform C and the terminals 18 and 19 of platforms B and C are connected respectively by leads 54 and 55 to contact arm 44' of resistor 22' of balancing circuit 52, and to terminal 46' of servo-amplifier 36' of said balancing circuit.

The shafts 33 and 33' of servo-motors 34 and 34' of balancing circuits 21 and 52 which are rotated to positions proportional to the weight on the nose wheel and main wheels respectively, are connected respectively to the inputs 181, 182 of a mechanical differential unit 183 to set the output 184 of the latter to a position related to the sum of the weights on the three platforms A, B and C which is the total weight of the aircraft.

The output 184, through a shaft 185 sets the contact arm 186 of a variable resistor 187 of a center of gravity bridge 188 to a value proportional to such total weight.

A total weight crew and passenger compensation resistor 189 is connected in series with resistor 187 and such series connected resistors are connected to junction 191 of center of gravity bridge 188 to form one arm of said bridge.

The position of contact arm 192 of resistor 189 is set by means of a shaft 193 controlled by knob 194 of dial 195 so that the sum of resistors 187 and 189 will be equal to the compensated total weight of the aircraft.

As illustratively shown, two bridges 196, 196' are provided, the former determining the moment of the weight on the nose wheel and the latter the moment of the weight on the main wheels, both with respect to the reference datum, illustratively the nose of the aircraft. As the bridges are identical, only the former will be described, corresponding elements of the latter bridge having the same reference numerals primed.

Shaft 33 is connected to the contact arm 197 of variable resistor 198. Connected in series with resistor 198 is a crew and passenger compensation resistor 199 and such series connected resistors are connected to juncture 201 of bridge 196 to form one arm of the bridge. The position of contact arm 202 of resistor 199 is set by means of a shaft 203 controlled by knob 204 of dial 205.

As resistors 198 and 198' will be set to values proportional to the weight on the nose wheel and main wheels respectively, and as the resistors 199 and 199' will be set to values based on the distribution of the crew and passenger weight on the nose wheel and main wheels, respectively, resistors 198, 199 and 198', 199' will be of value proportional to the compensated weight on the nose wheel and main wheels respectively.

A fixed resistor 206 is connected to junction 201 to form a second arm of bridge 196. A variable resistor 207 of value proportional to the distance between the reference datum and the nose wheel is connected in series with an off-level compensation resistor 208, the function of which is to correct for the off-level attitude of the aircraft at the time its center of gravity is being determined.

Thus, as shown in FIG. 1, the aircraft when loaded, may have its longitudinal axis LA displaced from the horizontal by an amount equal to angle "a" and the aircraft is generally provided with a level plate L which may be used in determining the extent of such displacement. In the illustrative embodiment, the correction for level flight attitude of the aircraft is equal to the distance D between the reference datum and the landing gear (nose or main wheels) divided by the cosine of angle "a" less such distance D, and the resistors 208, 208' are so calibrated that additional resistance will be placed into circuit of value proportional to:

$$\frac{D}{\cosine a} - D$$

The series connected resistors 207, 208 are connected to junction 209 of bridge 196 to form the third arm of said bridge. The position of contact arm 211 of resistor 207 is set by means of a shaft 212 controlled by knob 213 of dial 214 to a value related to the actual distance from the reference datum of the nose wheel and the position of contact arm 211' of resistor 207' is set by means of a shaft 212' controlled by knob 213' of dial 214' to a value related to the actual distance from the reference datum to the main wheels.

The position of contact arm 215 and 215' of off-level compensating resistor 208, 208' is set by means of a shaft 216, 216' controlled by knob 217, 217' of dial 218, 218' to a position based upon the angle of inclination of the aircraft as determined by a suitable device such as a spirit level positioned on the conventional level plate of the aircraft.

Connected to junction 209 to form the fourth arm of bridge 196 is a variable balancing resistor 221, the contact arm 222 of which is driven by the shaft 223 of a servo-motor 224. The input of said servo-motor is connected to the output of servo-amplifier 225, connected across the junctions of the bridge 196. Thus, when the bridge 196 is in balance, resistor 221 will be set to a value proportional to the compensated moment of the weight on the nose wheel and when bridge 196' is in balance, resistor 221' will be set to a value proportional to the compensated moment of the weight of the main wheels, in both cases the moments being about the nose of the aircraft.

The shafts 223, 223' of servo-motors 224, 224' also drive the contact arms 226, 226' of variable resistors 227, 227' to set the latter to values proportional to the moments due to the weight on the nose wheel and main wheels respectively, compensated as above described.

The resistors 227, 227' are connected in series to junction 191 of center of gravity bridge 188 to form the second arm of the bridge. A fixed resistor 228 is connected to junction 229 of bridge 188 to form the third arm of the bridge and a variable resistor 231 is connected to said junction 229 to form the fourth arm thereof.

The contact arm 232 of resistor 231 is driven by the shaft 233 of servo-motor 234, the input of which is connected to the output of servo-amplifier 235 connected across junctions 191, 229 of bridge 188.

Thus, when the bridge is in balance, by the formula:

$$\frac{\text{Total Moment}}{\text{Total Weight}} = \frac{\text{Center of Gravity}}{\text{Constant}}$$

the resistor 231 will be set to a value proportional to the compensated distance of the center of gravity from the reference datum, illustratively the nose of the aircraft, and such distance may be shown on an indicator 236 driven by shaft 233.

In the operation of the equipment, as the outputs from the platforms B and C are connected in series, the voltage from platform A and the combined voltages from platforms B and C will be applied in series with voltages opposite in polarity, from the series connected voltage dividers 23, 27 and 23', 27' across the respective terminals 46, 50 and 46', 50' of servo-amplifiers 36, 36' and if each pair of such opposed voltages are unequal, the associated motor 34, 34' will be energized to turn shafts 33, 33' and move contact arms 31, 31'.

When each contact arm 31, 31' has reached that portion of the corresponding resistance 23, 23' which provides a voltage equal to that supplied from the output terminals of the associated platforms A, B and C, balance will be achieved, so that the motors 34, 34' will stop rotating and the counters 37, 37' driven by shaft 33 and 33' will indicate the weight of the unloaded platforms A and B plus C respectively.

The contact arms 32 and 32' are then manually adjusted to balance out the weight of the unloaded platform which will be achieved when the counters 37, 37' indicate zero.

As the crew and the passengers may not be in the aircraft at the time its center of gravity is determined, the effect that the weight of the crew and passengers will have on the calculations is set into the circuit. Thus, assuming that the aircraft is to carry a crew of four and two passengers, by consulting a chart previously prepared by the aircraft manufacturer, the effect that such personnel will have on the gross weight of the aircraft and on the nose wheel weight and main wheel weight (which is dependent upon the position of such personnel) can be determined and the contact arms 192, 202 and 202' of resistors 189, 199 and 199' are set to the desired amount. Based upon weights of 180 pounds person, a personnel load of 6 will add 1,080 to the gross weight and based on the chart we will assume that it will add 200 pounds to the nose wheel weight and 880 pounds to the main wheel weight. Thus, assuming that one ohm equals one pound, 1,080 ohms of resistor 189 will be placed in series with resistor 187; 200 ohms of resistor 199 will be placed in series with resistor 198 and 880 ohms of resistor 199' will be placed in series with resistor 198'.

When the nose wheel of the loaded aircraft is placed on platform A and the main wheels on platform B and C respectively, as previously described, due to the weight of the aircraft on the platforms A, B and C, the output of platform A and the combined output of platforms B and C will be applied across the terminals 46, 50 of servo-amplifier 36 of balancing circuit 21, and across the terminals 46', 50' of servo-amplifier 36' of balancing circuit 52.

As previously described, the associated servo-motors 34 and 34' will set contact arms 31 and 31' until that portion of the associated resistor 23, 23' is in circuit which provides a voltage equal to that supplied from platform A and platforms B, C. At this time the circuits 21, 52 will be balanced and the mtors 34, 34' will stop rotating.

For a model X aircraft, assuming the weight on the nose wheel is 6,000 pounds, the shaft 33 of motor 34 will set contact arm 197 to tap off 6,000 ohms of resistor 198 and as this resistor is in series with resistor 199 set to 200 ohms, 6,200 ohms will be placed into circuit to form one arm of moment bridge 196.

Assuming the weight on the main wheels is 44,000 pounds, the shaft 33' of motor 34' will set contact arm 197' to tap off 44,000 ohms of resistor 198' and as this resistor is in series with resistor 199' set to 880 ohms, 44,880 ohms will be placed into circuit to form one arm of moment bridge 196'.

The shaft 33 will also turn the input 181 of differential 183 to a position related to a value of 6,000 ohms, and the shaft 33' of motor 34' will turn the input 182 of differential 183 to a position related to a value of 44,000 pounds. Hence, the output 184 of differential 183 will set the resistor 186 of bridge 188 to a value related to 50,000 pounds or 50,000 ohms (the sum of the weight on platforms A and B plus C). As the resistor 189 of bridge 65 has been set to a value of 1,080 pounds or 1,080 ohms, 51,080 ohms will be set into one arm of center of gravity bridge 188.

A second arm of bridge 188 is defined by the resistors 227, 227' which are set by the moment bridges 196 and 196'.

Thus, since resistors 198, 199 which form one arm of bridge 196 have a value of 6,200 ohms, and resistor 207 has a value of say 100 ohms proportional to a distance of 100 inches between the reference datum and the nose wheel and resistor 208 in series therewith, assuring an angle of inclination of 4 degrees by the formula $$\frac{100}{\cosine a} - 100$$

has a value of .24 ohm, when bridge 196 is in balance by the formula: $NW \times arm = $ moment where $NW = 6,200$ and arm$=100.24$, resistor 221 will be set to a value of 621,488 inch-pounds and resistor 227 will also be set to this value.

Similarly, since resistors 198', 199' which form one arm of bridge 196' have a value of 44,880 ohms and resistor 207' has a value of say 430 ohms proportional to a distance of 430 inches between the reference datum and the main wheels and resistor 208' in series therewith, assuming the angle of inclination of 4 degrees, by the formula $$\frac{430}{\cosine a} - 430$$

has a value of 1.03 ohms, when bridge 196' is in balance by the formula:

$$MWX \ arm = moment$$

where $$MW = 44,880 \text{ and arm} = 431.03$$

resistor 221' will be set to a value of 19,344,626 ohms proportional to a moment of 19,344,626 inch-pounds and resistor 227 will also be set to this value.

Thus, resistors 227 and 227' which form the second arm of bridge 188 will have a value of 19,966,114 ohms proportional to a moment of 19,966,114 inch-pounds.

By the formula:

$$\frac{\text{Total moment}}{\text{Total weight}} = \frac{\text{Center of gravity}}{\text{Constant}}$$

where

Total moment$=19,966,114$
Total weight$=51,080$ then when bridge 188 is in balance the resistor 231 will be set to a value of 390.9 which is the compensated distance of the center of gravity from the reference datum.

The equipment above described thus permits determination of the center of gravity of an aircraft without need for crew or passengers being on board, as it has means for compensating for the weight of such personnel. It also has means for compensating for the off-level attitude of the aircraft at the time the center of gravity indication is effected, as well as for variations in the arms of the supporting gear from the values given in the technical manual of the aircraft. Although the equipment as illustratively shown and described compensates for all of such factors, it is within the scope of the invention to compensate for one or more of such factors.

It will be clear that the equipment of the present invention may be used to determine the position of the center of gravity of any of a multiplicity of types of aircraft and to indicate such position in inches on but a single dial scale.

It is thus seen that each of the various compensating factors that may vary from plane to plane or from flight to flight of any one aircraft or model thereof, can readily and unerringly be introduced into circuit to assure correct determination of the center of gravity with all such variable factors included.

While in the specification and drawings, strain gauges have been shown as the weight responsive impedance controlling elements to measure weight, it is of course to be understood that other types of weight responsive means such as hydraulic cells, beam or spring scales and the like could be used to place appropriate impedance in circuit.

It is further to be understood that although the impedances as illustrated in the specification and drawings are resistors, other types of impedances such as reactances containing either or both inductances and capacitances could be used for the purpose.

Where the equipment is capable of universal use for various models of aircraft, it ordinarily will be retained on the airfield, but if desired, can be carried by an aircraft and set to fit its particular requirements as above described.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for determining the position with respect to a given reference datum of the center of gravity of an aircraft of the type having a plurality of sets of supporting gear, said equipment comprising an adjustable variable impedance means for each of said sets of supporting gear and respectively calibrated for response proportional to the weight carried by such set of supporting gear, means to set the adjustable variable impedance means to a value that corresponds to the weight of its related set of supporting gear, a further impedance means for each set of supporting gear and of value that corresponds to the distance of said set of supporting gear from the reference datum, a multiplying balancing circuit for each of said sets of supporting gear, said balancing circuit including the adjustable variable impedance means, and the further impedance means, said multiplying balancing circuits determining the product of the adjustable variable impedance means and the further impedance means, said products being the moments of the weight on the associated set of supporting gear, an additional adjustable impedance means for each of said sets of supporting gear, means controlled by the multiplying means to set said additional adjustable impedance means to a value related to the moment of the weight on the associated set of supporting gear, means connecting said additional adjustable variable impedance means to determine the sum of such moments, an adjustable total weight impedance means, means controlled by the means to set the adjustable variable impedance means to set said total weight impedance means to a value that corresponds to the total weight of the aircraft, a dividing balancing circuit including said connected additional adjustable impedance means and said total weight impedance means to determine the quotient of the total impedance of the connected additional adjustable variable impedance means divided by the impedance of the total weight impedance means, said quotient being proportional to the distance of the center of gravity of the aircraft from the reference datum and means controlled by said dividing balancing circuit to indicate such quotient.

2. The combination set forth in claim 1 in which a plurality of selectively controlled variable compensating impedance means are additively connected respectively to each of said adjustable variable impedance means and to said total weight impedance means.

3. The combination set forth in claim 1 in which a selectively controlled variable compensating impedance means is additively connected to said further impedance means.

4. The combination set forth in claim 1 in which a plurality of selectively controlled variable compensating impedance means are additively connected respectively to said adjustable, said total weight and said further impedance means.

5. Equipment for determining the position with respect to a given reference datum of the center of gravity of an aircraft of the type having a plurality of sets of supporting gear, said equipment comprising an adjustable variable impedance means for each of said sets of supporting gear and respectively calibrated for response proportional to the weight carried by such sets of supporting gear, means to set the adjustable variable impedance means to a value that corresponds to the weight on its related set of supporting gear, a further impedance means for each set of supporting gear and of value that corresponds to the distance of said set of supporting gear from the reference datum, a plurality of multiplying balancing circuits corresponding in number to the number of sets of supporting gear, and each including an adjustable variable impedance unit and a further impedance means, each balancing circuit also comprising an additional impedance means and a balancing impedance means, said four impedance means being connected in each balancing circuit so that at balance thereof each balancing impedance means will be set to a value proportional to the product of the weight on the associated set of supporting gear and the distance of such set of supporting gear from the reference datum, said product being the moment of the weight on the associated set of supporting gear with respect to the reference datum, a second additional adjustable impedance means controlled by the balancing impedance means of each of said balancing circuits, also to be set to a value proportional to the associated moment, means additively connecting said second additional impedance means, a total weight impedance means controlled by the means to set the adjustable variable impedance means to set said total weight impedance means to a value that corresponds to the total weight of the aircraft, a further balancing circuit including said connected second additional impedance means, said total weight impedance means, a further additional impedance means and a further balancing impedance means, said further balancing circuit determining the quotient of the total impedance of the additively connected second additional impedance means divided by the impedance of the total weight impedance means, said further balancing impedance means being set to said quotient when said further balancing circuit is in balance and means controlled by the setting of said further balancing impedance means to indicate the center of gravity of the aircraft.

References Cited in the file of this patent
UNITED STATES PATENTS
2,735,291     Quinn _____ Feb. 21, 1956